(12) United States Patent
Hoshiba et al.

(10) Patent No.: US 12,023,963 B2
(45) Date of Patent: Jul. 2, 2024

(54) PNEUMATIC TIRE

(71) Applicant: The Yokohama Rubber Co., LTD., Tokyo (JP)

(72) Inventors: Takashi Hoshiba, Hiratsuka (JP); Noriyoshi Koyama, Hiratsuka (JP); Mizuki Kuninaka, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 166 days.

(21) Appl. No.: 17/049,002

(22) PCT Filed: Apr. 10, 2019

(86) PCT No.: PCT/JP2019/015541
§ 371 (c)(1),
(2) Date: Oct. 19, 2020

(87) PCT Pub. No.: WO2019/203077
PCT Pub. Date: Oct. 24, 2019

(65) Prior Publication Data
US 2021/0237518 A1    Aug. 5, 2021

(30) Foreign Application Priority Data
Apr. 19, 2018  (JP) .................................. 2018-080824

(51) Int. Cl.
*B60C 13/00* (2006.01)
*B60C 13/02* (2006.01)
(Continued)

(52) U.S. Cl.
CPC ............ *B60C 13/001* (2013.01); *B60C 13/02* (2013.01); *B60C 13/04* (2013.01);
(Continued)

(58) Field of Classification Search
CPC ............ B60C 13/001; B60C 2015/061; B60C 15/0603
See application file for complete search history.

(56) References Cited

U.S. PATENT DOCUMENTS

| | | |
|---|---|---|
| 2004/0103974 A1 | 6/2004 | Majumdar et al. |
| 2005/0103419 A1* | 5/2005 | Yamamoto ............. B60C 13/00 152/557 |

(Continued)

FOREIGN PATENT DOCUMENTS

| | | |
|---|---|---|
| DE | 20 2015 009 105 U1 | 12/2016 |
| DE | 11 2018 005 489 T5 | 10/2020 |

(Continued)

OTHER PUBLICATIONS

Machine Translation: JP-2012224194-A, Toyofuku M, (Year: 2022).*

(Continued)

*Primary Examiner* — Kendra Ly
(74) *Attorney, Agent, or Firm* — Thorpe North & Western

(57) ABSTRACT

In a pneumatic tire, a two-dimensional code is provided on a surface of side rubber provided in a side portion. The two-dimensional code is formed of a dot pattern including two types of gray scale elements identifiably formed using surface irregularities. A two-dimensional code range in a tire radial direction in which the two-dimensional code is provided lies outward or inward of a bead filler rubber edge located outward of bead filler rubber in the tire radial direction.

20 Claims, 2 Drawing Sheets

(51) Int. Cl.
    *B60C 13/04* (2006.01)
    *B60C 15/06* (2006.01)
    *B60C 15/04* (2006.01)

(52) U.S. Cl.
    CPC .... *B60C 15/0603* (2013.01); *B60C 2013/006* (2013.01); *B60C 2013/007* (2013.01); *B60C 2013/045* (2013.01); *B60C 15/04* (2013.01)

(56) References Cited

U.S. PATENT DOCUMENTS

| | | | |
|---|---|---|---|
| 2006/0016543 A9 | 1/2006 | Majumdar et al. | |
| 2006/0151451 A1 | 7/2006 | Smith Jr. et al. | |
| 2010/0000648 A1 | 1/2010 | Nakano | |
| 2013/0240107 A1* | 9/2013 | Ebiko | B60C 15/0603 |
| | | | 152/541 |
| 2015/0075694 A1* | 3/2015 | Nagai | B60C 9/02 |
| | | | 152/523 |
| 2015/0306919 A1* | 10/2015 | Tokutake | B60C 13/00 |
| | | | 152/524 |
| 2017/0050473 A1* | 2/2017 | Muhlhoff | B60C 13/001 |
| 2018/0009275 A1* | 1/2018 | Iwabuchi | B60C 13/02 |
| 2020/0269636 A1 | 8/2020 | Shiraishi | |

FOREIGN PATENT DOCUMENTS

| | | | | |
|---|---|---|---|---|
| EP | 1 426 200 A2 | 9/2004 | | |
| EP | 2135753 A2 | * 12/2009 | ........... | B60C 13/001 |
| JP | H06-042307 | 6/1994 | | |
| JP | 2001-062938 | 3/2001 | | |
| JP | 2005-164655 | 6/2005 | | |
| JP | 2008-056176 | 3/2008 | | |
| JP | 2012-224194 | 11/2012 | | |
| JP | 2012224194 A | * 11/2012 | | |
| JP | 2014-213718 | 11/2014 | | |
| JP | 2015-042535 | 3/2015 | | |
| JP | 2015120459 A | * 7/2015 | | |
| JP | 2015-160488 A | 9/2015 | | |
| JP | 2017-114424 | 6/2017 | | |
| JP | 2017-516698 | 6/2017 | | |
| WO | WO 2005/000714 | 1/2005 | | |
| WO | WO 2007/136091 | 11/2007 | | |
| WO | WO 2015/029927 | 3/2015 | | |
| WO | WO 2015/165863 | 11/2015 | | |

OTHER PUBLICATIONS

Machine Translation: EP-2135753-A2, Behr U, (Year: 2023).*
Machine Translation: JP-2015120459-A, Tomita S, (Year: 2023).*
International Search Report for International Application No. PCT/JP2019/015541 dated Jun. 11, 2019, 4 pages, Japan.

* cited by examiner

PNEUMATIC TIRE

TECHNICAL FIELD

The present technology relates to a pneumatic tire and particularly relates to a pneumatic tire including a two-dimensional code engraved in a sidewall portion of the tire.

BACKGROUND ART

In recent years, a proposal has been made to provide a two-dimensional code, in which information is recorded, on a sidewall portion of a pneumatic tire (hereinafter also simply referred to as tire). The two-dimensional code can include more information than a one-dimensional code. Thus, various information can be included in the two-dimensional code for management of the tire. There has been a proposal that a pattern of predetermined dot holes be engraved in a sidewall portion to provide, on the sidewall portion, a two-dimensional code including a pattern of gray scale elements (International Patent Publication No. WO 2005/000714).

The two-dimensional code formed by engraving the pattern of predetermined dot holes in the sidewall portion is prevented from disappearing unless the sidewall portion is worn away, allowing the tire to be effectively managed.

When a pneumatic tire provided with such a plurality of dot holes for a two-dimensional code is new, the two-dimensional code can be read. However, in a case where the tire rolls under a load in an outdoor environment, the two-dimensional code may become harder to read. "Read a two-dimensional code" refers to reading a two-dimensional code using a two-dimensional code reader, for example, a mobile terminal. "Harder to read" refers to when reading the two-dimensional code often fails. The two-dimensional code provided on the pneumatic tire is utilized by reading the information recorded in the two-dimensional code while the pneumatic tire is in use. Thus, in a case where the tire is used for an extended period of time, cracks may occur and develop in the dot holes of the two-dimensional code to form irregularities on the surface of the two-dimensional code. Then, undesirably, distinction of the gray scale elements becomes difficult, making the two-dimensional code harder to read. Thus, the two-dimensional code is preferably inhibited from becoming harder to read when the tire is used for an extended period of time.

Additionally, each of the dot holes has a shape recessed from the surface of the sidewall portion. This shape is not preferable in terms of durability of the side rubber and hence durability of the pneumatic tire because, during the use of the tire, cracks occur in the dot holes and develop in the thickness direction of the side rubber and further along the surface of the sidewall portion.

SUMMARY

The present technology provides a pneumatic tire engraved with a two-dimensional code and that can inhibit a two-dimensional code from being harder to read even when the pneumatic tire is used for an extended period of time.

One aspect of the present technology is a pneumatic tire. The pneumatic tire includes:
- a pair of bead cores with an annular shape,
- at least one carcass ply with a toroidal shape wound around the pair of bead cores and provided between the pair of bead cores,
- side rubber provided in each of sidewall portions of the pneumatic tire to cover the carcass ply from outside the tire, and
- bead filler rubber provided along the carcass ply and extending outward in a tire radial direction from a side of each of the pair of bead cores.

A two-dimensional code is provided on a surface of the side rubber, the two-dimensional code formed of a dot pattern including two types of gray scale elements identifiably formed using surface irregularities on the side rubber, and a two-dimensional code range in the tire radial direction in which the two-dimensional code is provided lies outward or inward in the tire radial direction of a bead filler rubber edge located outward of the bead filler rubber in the tire radial direction.

Preferably, a distance along the tire radial direction between the bead filler rubber edge and an outer edge of the two-dimensional code located closest to the bead filler rubber edge is 5% or more of a length of the two-dimensional code along the tire radial direction.

Preferably, the distance along the tire radial direction between the bead filler rubber edge and the outer edge of the two-dimensional code located closest to the bead filler rubber edge is 100% or less of the length of the two-dimensional code along the tire radial direction.

Preferably, the distance along the tire radial direction between the bead filler rubber edge and the outer edge of the two-dimensional code located closest to the bead filler rubber edge is 1.5 or more times as long as a length of one side of a unit cell forming the dot pattern of the two-dimensional code.

Preferably, the two-dimensional code range lies outward of the bead filler rubber edge in the tire radial direction and lies inward, in the tire radial direction, of a maximum width position of the carcass ply located farthest outward from a tire equator line in a tire lateral direction.

Preferably, the bead filler rubber has a higher hardness than the side rubber.

Preferably, the two-dimensional code is provided in a smooth surface region of the surface of the sidewall portion where surface irregularities of ridges are not provided.

Preferably, the surface irregularities in the dot pattern include dot holes formed in the side rubber, and
- a portion of the side rubber in the two-dimensional code range has a thickness of 2.5 mm or more at any location.

Preferably, the surface irregularities in the dot pattern include dot holes formed in the side rubber, and
- a distance from a bottom of each of the dot holes to the carcass ply is 2.5 or more times as long as a hole depth of each of the dot holes.

Preferably, assuming that SH is a cross-sectional height along the tire radial direction from an innermost position of each of the pair of bead cores in the tire radial direction to a tire maximum outer diameter position, a distance H along the tire radial direction from the innermost position of each of the pair of bead cores in the tire radial direction to a center position of the two-dimensional code in the tire radial direction is 70% or less of the cross-sectional p height SH.

Preferably, the two-dimensional code is provided on each of the sidewall portions on both sides of the pneumatic tire in a tire lateral direction.

According to the pneumatic tire described above, it is possible to inhibit a two-dimensional code from becoming harder to read even when the pneumatic tire is used for an extended period of time.

DETAILED DESCRIPTION

A pneumatic tire according to one embodiment will be described in detail below.

In the present specification, "tire lateral direction" is the direction parallel with the rotation axis of the pneumatic tire. "Outward in the tire lateral direction" is the direction in the tire lateral direction away from a tire equator line CL (see FIG. 1) that represents a tire equatorial plane. "Inward in the tire lateral direction" is the direction in the tire lateral direction closer to the tire equator line CL. "Tire circumferential direction" is the direction of rotation of the pneumatic tire about the center of the rotation axis. "Tire radial direction" is the direction orthogonal to the rotation axis of the pneumatic tire. "Outward in the tire radial direction" refers to the direction away from the rotation axis. Similarly, "inward in the tire radial direction" refers to the direction closer to the rotation axis.

In the present specification, a two-dimensional code refers to a matrix display type code containing information in two directions, as opposed to a one-dimensional code (barcode) that contains information only in the lateral direction. Examples of two-dimensional codes include a QR code® (trade name), a DataMatrix (trade name), a MaxiCode, a PDF-417 (trade name), a Code 16K (trade name), a 49 Code (trade name), an Aztec Code (trade name), an SP Code (trade name), a VeriCode® (trade name), and a CP Code (trade name).

Pneumatic Tire

Figure 1:
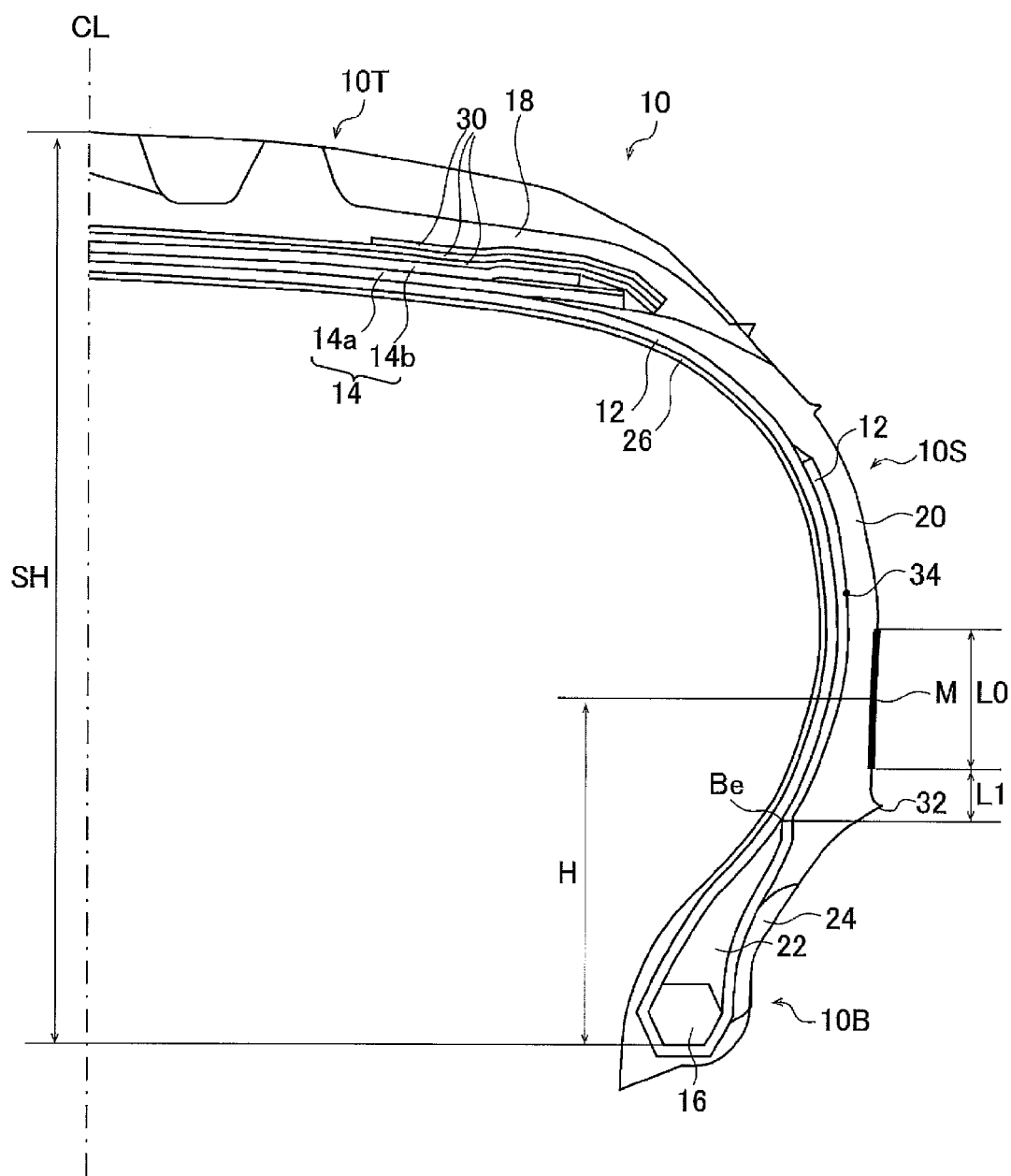
FIG. 1 is a diagram illustrating an exemplary configuration of a pneumatic tire according to one embodiment.

FIG. 1 is a diagram illustrating an exemplary configuration of a pneumatic tire 10 (hereinafter simply referred to as "tire 10") according to one embodiment. FIG. 1 illustrates a profile cross-section on one side of a tire equator line CL in the tire lateral direction.

The tire 10 includes a tread portion 10T including a tread pattern, a pair of bead portions 10B formed on both sides of the tire 10 in the tire lateral direction, and a pair of sidewall portions 10S provided on both sides of the tread portion 10T and respectively connecting each one of the pair of bead portions 10B and the tread portion 10T. The tread portion 10T is a portion that comes into contact with a road surface. The sidewall portions 10S are portions provided to sandwich the tread portion 10T from both sides of the tread portion 10T in the tire lateral direction. The bead portions 10B are portions connected to the sidewall portions 10S and located inward of the sidewall portions 10S in the tire radial direction.

The tire 10 primarily includes a carcass ply 12, a belt 14 and a bead core 16 as framework members, and a tread rubber 18, side rubbers 20, bead filler rubbers 22, rim cushion rubbers 24, and an innerliner rubber 26 disposed around the framework members.

The carcass ply 12 is formed of a carcass ply member that is made of organic fibers covered with rubber and wound between the pair of annular bead cores 16 into a toroidal shape. The carcass ply 12 is wound around the bead cores 16 and extends outward in the tire radial direction. The belt 14 is made up of two belt members 14a and 14b, and provided outward of the carcass ply 12 in the tire radial direction. The belt 14 is a member formed of steel cords covered with rubber. The steel cords are inclined at a predetermined angle, for example, from 20 to 30° with respect to the tire circumferential direction. The width of the lower belt member 14a in the tire lateral direction is greater than the width of the upper belt member 14b in the tire lateral direction. The steel cords of the two belt members 14a and 14b are inclined in opposite directions. As such, the belt members 14a and 14b are crossing layers serving to suppress expansion of the carcass ply 12 due to the pressure of the air in the tire.

The tread rubber 18 is disposed outward of the belt 14 in the tire radial direction. Both end portions of the tread rubber 18 connect to the side rubbers 20 to form the sidewall portions 10S. The rim cushion rubbers 24 are provided at the inward ends of the side rubbers 20 in the tire radial direction, and come into contact with the rim on which the tire 10 is mounted. The bead filler rubbers 22 are provided outward of the bead cores 16 in the tire radial direction so as to be interposed between a portion of the carcass ply 12 before the carcass ply 12 is wound around the bead cores 16 and a portion of the carcass ply 12 after the carcass ply 12 is wound around the bead cores 16. The bead filler rubber 22 extends outward from a side of the bead core 16 in the tire radial direction along the carcass ply 12. The innerliner rubber 26 is provided on the inner surface of the tire 10 facing a tire cavity region that is filled with air and is surrounded by the tire 10 and the rim.

The tire 10 also includes a three-layered belt cover 30 formed of organic fibers covered with rubber between the belt member 14b and the tread rubber 18. The belt cover 30 covers the belt 14 from outward of the belt 14 in the tire radial direction. The belt cover 30 is not required and may be provided as needed. The number of layers that make up the belt cover 30 is not limited to three, and may be one or two layers.

Figure 2A:
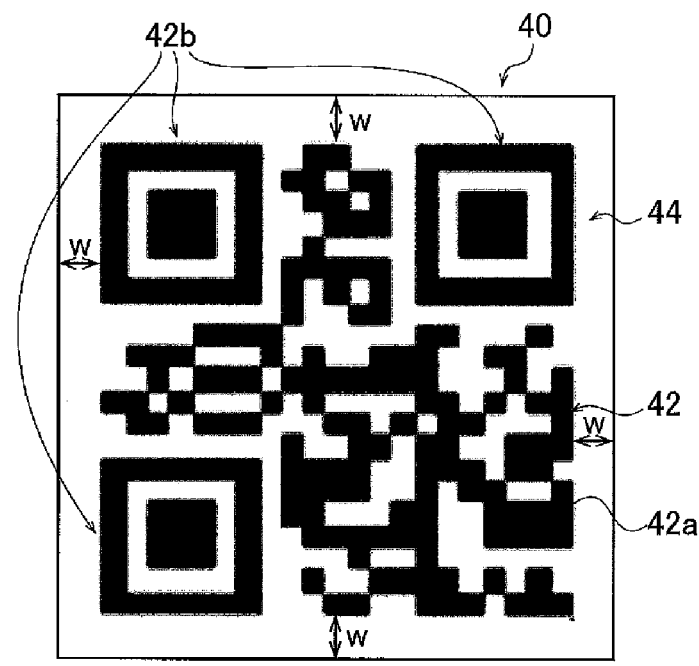
FIGS. 2A and 2B are diagrams illustrating an example of a two-dimensional code according to one embodiment.

A two-dimensional code 40 illustrated in FIG. 2A is formed on the surface of the sidewall portion 10S of the tire 10 configured as described above. In FIG. 1, the position of the two-dimensional code 40 is indicated by a thick line.

Sidewall Portion 10S and Two-Dimensional Code 40

Figure 2B:
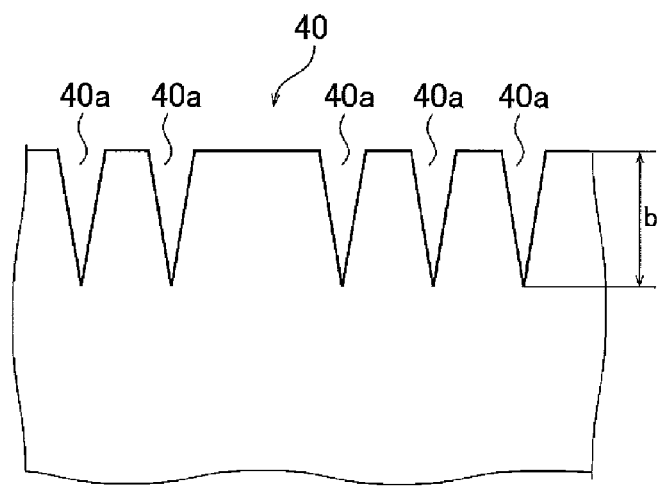

FIG. 2A is a diagram illustrating an example of the two-dimensional code 40 according to one embodiment provided on the surface of the sidewall portion 10S of the tire 10. FIG. 2B is a diagram illustrating an example of surface irregularities of the two-dimensional code 40.

The two-dimensional code 40 is engraved on the surface of the side rubber 20 in either of the sidewall portions 10S. The two-dimensional code 40 is formed of a dot pattern made up of two types of gray scale elements distinguishable from each other by irregularities on the surface. The surface irregularities are, for example, dot-shaped holes. The two-dimensional code 40 is a pattern formed by converging a laser beam on the surface of the sidewall portion 10S to concentrate energy and locally heat and burn the side rubber 20, thus engraving a plurality of fine dot holes 40a in the surface. Each dot hole 40a is, for example, a cone-shaped hole, and has, in the tread surface, a diameter of, for example, from 0.1 to 1.0 mm and a hole depth b of, for example, from 0.3 to 1.0 mm.

The two-dimensional code 40 is formed by providing one dot hole (recess portion) in a dark unit cell region of a unit cell that defines the gray scale elements that make up the two-dimensional code. No dot holes (recess portions) are provided in a light unit cell region of the unit cell. In other words, the two-dimensional code 40 has a configuration in which the dot holes (recess portions) are arranged such that each dot hole (recess portion) forms one dark unit cell region among the gray scale elements in corresponding to a plurality of rectangular unit cell regions having the same size and divided into lattice-like shapes. In FIG. 2A, the dark region of the unit cell region is represented by a region colored in black.

The two-dimensional code 40 illustrated in FIG. 2A is a QR code (registered trademark) and includes a dot pattern region 42 in which a dot pattern includes two types of gray scale elements. A blank region 44 is provided around the dot pattern region 42. The blank region 44 is surrounded by light-colored elements of the gray scale elements and includes light-colored elements. In FIG. 2A, frame lines are illustrated in order to clarify outer edges of the blank region 44. A width w of the blank region 44 is preferably, for example, four to five times the dimension size of the unit cell region within the dot pattern region 42. For example, the blank region 44 is preferably from 15 to 25% the width of the dot pattern region 42.

Because the two-dimensional code 40 illustrated in FIG. 2A is a QR code® (trade name), the dot pattern region 42 includes a data cell region 42a in which data cells of the QR code® (trade name) are displayed, and position detection pattern regions 42b in which position detection patterns are displayed.

Such a two-dimensional code 40 is provided on the surface of the side rubber member 20 (shown in thick lines in FIG. 1). Here, the two-dimensional code range in the tire radial direction in which the two-dimensional code 40 is provided lies outward or inward of a bead filler rubber edge Be outward of the bead filler rubber 22 in the tire radial direction. In the example illustrated in FIG. 1, the two-dimensional code range lies outward of the bead filler rubber edge Be in the tire radial direction. The two-dimensional code range in the tire radial direction does not include the position of the bead filler rubber edge Be in the tire radial direction.

The arrangement of the two-dimensional code 40 as described above is adopted to inhibit the two-dimensional code 40 from becoming harder to read due to a change in the surface irregularities of the two-dimensional code 40 during long-term use. The bead filler rubber edge Be acts as a bend point such that deformation of the side rubber 20 varies between a region outward of the bead filler rubber edge Be and a region inward of the bead filler rubber edge Be in the tire radial direction. Further, the surface of the side rubber 20 is likely to be significantly strained at the position of the bead filler rubber edge Be in the tire radial direction. For example, in a case where the tire 10 rolls under the load of the tire 10, the side rubber 20, together with the bead filler rubber 22, is deformed and bent outward in the tire lateral direction due to deflecting deformation of the tire 10. The bead filler rubber edge Be, acting as a bend point of this bending deformation, is likely to be significantly strained. Thus, a surface portion of the side rubber 20 of the bead filler rubber edge Be is also likely to be significantly strained. With the two-dimensional code 40 provided on the surface portion, the surface portion is subjected to intermittent significant strain in conjunction with rolling of the tire 10, and the dot holes 40a of the two-dimensional code 40 are likely to crack. Thus, the surface irregularities of the two-dimensional code 40 change during long-term use of the tire 10, and as a result, the two-dimensional code 40 is likely to become harder to read.

Accordingly, the two-dimensional code range lies inward or outward of the bead filler rubber edge Be in the tire radial direction.

According to one embodiment, a distance L1 along the tire radial direction between the bead filler rubber edge Be and the outer edge of the two-dimensional code 40 located closest to the bead filler rubber edge Be, namely, the outer edge of the dot pattern region 42 (see FIG. 1), is preferably 5% or more of a length L0 of the two-dimensional code 40 along the tire radial direction. In a case where the distance L1 is less than 5% of the length L0, the dot holes 40a of the two-dimensional code 40 are likely to crack under influence of significant strain around the bead filler rubber edge Be, and long-term use of the tire 10 makes the two-dimensional code 40 harder to read. In addition, as described above, the blank region 44 (see FIG. 2A) surrounding the outer edges of the two-dimensional code 40 is provided outward of the outer edges to make the two-dimensional code 40 easier to read. The same region as the light-colored element of the gray scale elements of the two-dimensional code 40 is formed in the blank region 44, as described above. Thus, in a case where the blank region 44 is cracked, the surface irregularities become more significant, making the light-colored elements darker and, as a result, readability decreases. Also in this regard, the distance L1 is preferably 5% or more of the length L0. At a position far outward from the bead filler rubber edge Be in the tire radial direction, the tire is significantly deformed, and thus undesirably, the two-dimensional code 40 is likely to be cracked. Thus, in a case where the two-dimensional code range is located outward of the bead filler rubber edge Be in the tire radial direction, the distance L1 is preferably 100% or less of the length L0.

Additionally, the distance L1 is preferably 1.5 times or more as long as the length of one side of the unit cell of the two-dimensional code 40, and more preferably 3 times or more as long as the length. Accordingly, the position of the bead filler rubber edge Be in the tire radial direction can be prevented from being included in the range of the blank region 44 in the tire radial direction. In a case where the blank region 44 includes the position of the bead filler rubber edge Be in the tire radial direction, long-term use of the tire 10 causes the blank region 44 to be cracked, making the two-dimensional codes 40 harder to read.

According to one embodiment, the two-dimensional code range preferably lies outward of the bead filler rubber edge Be in the tire radial direction, and lies inward, in the tire radial direction, of the maximum width position of the carcass ply 12 located farthest outward from the tire equator line C1 in the tire lateral direction. The thickness of the side rubber is smaller in a portion of the side rubber outward in the tire radial direction of the maximum position of the carcass ply 12 in the tire lateral direction than in the other portions. In this portion, the side rubber 20 is significantly deformed. Thus, a large number of the dot holes 40a formed in this portion are likely to cause a large number of cracks, and long-term use of the tire 10 makes the two-dimensional code significantly hard to read. Additionally, since the two-dimensional code 40 is provided outward of the bead filler rubber edge Be in the tire radial direction, when the tire 10 is mounted on a rim, the two-dimensional code 40 is not excessively close to the tip of the rim and can be sufficiently illuminated. The dot pattern of the two-dimensional code 40 including the two types of gray scale elements can be more definitely identified, and the two-dimensional code 40 is easier to read.

According to one embodiment, the hardness of the bead filler rubber 22 (for example, JIS (Japanese Industrial Standard) K 6253 Shore A50) is preferably higher than the hardness of the side rubber 20 (for example, JIS K 6253 Shore A50). The hardness of the bead filler rubber 22 is, for example, 70 to 100 at a temperature of 20° C., and the hardness of the side rubber 20 is, for example, 50 to 60 at a temperature of 20° C.

According to one embodiment, the two-dimensional code 40 is preferably provided in a smooth surface region of the surface of the sidewall portion where surface irregularities of ridges are not provided. Accordingly, the dot pattern of the two-dimensional code 40 including the two types of gray scale elements can be more definitely identified, and the two-dimensional code 40 is easier to read.

According to one embodiment, the portion of the side rubber 20 in the two-dimensional code range preferably has a thickness of 2.5 mm or more at any location. Here, the thickness of the side rubber 20 in the two-dimensional code range refers to the thickness of a portion within the two-dimensional code range that includes none of the dot holes 40. Accordingly, cracks are less likely to occur in the two-dimensional code 40 during long-term use of the tire 10, and even in a case where cracks occur, the cracks are hindered from reaching the carcass ply 12. Thus, the tire 10 is less likely to be broken, and the two-dimensional code 40 is likely to be inhibited from becoming harder to read.

According to one embodiment, the distance from the bottom of each dot hole 40a to the carcass ply 12 is preferably 2.5 or more times as long as the hole depth b (see FIG. 2B) of the dot hole 40a.

The upper limit of the distance from the bottom of the dot hole 40a to the carcass ply 12 is not particularly limited and is, for example, 25 or less times as long as the hole depth b of the dot hole 40a. Accordingly, cracks are less likely to occur in the two-dimensional code 40 during long-term use of the tire 10, and even in a case where cracks occur, the cracks are hindered from reaching the carcass ply 12. Thus, the tire 10 is less likely to be broken, and the two-dimensional code 40 is likely to be inhibited from becoming harder to read. Note that the distance from the bottom of the dot hole 40a to the carcass ply 12 is the shortest distance from the bottom of the dot hole 40a to a location of the carcass ply 12 closest to the bottom of the dot hole 40a. Additionally, the thickness of the side rubber 20 refers to the dimension of the thickness, in the tire profile cross section illustrated in FIG. 1, at each position in a direction orthogonal to an material extension direction of the carcass ply 12.

According to one embodiment, a distance H (see FIG. 1) along the tire radial direction from the innermost position in the tire radial direction of the bead core 16 illustrated in FIG. 1 to a center position M (see FIG. 1) in the tire radial direction of the two-dimensional code 40 (see FIG. 1) is preferably 70% or less of a cross-sectional height SH (see FIG. 1) of the tire 10. "Cross-sectional height SH" refers to the distance along the tire radial direction from the innermost position in the tire radial direction of the bead core 16 of the tire 10 to the tire maximum outer diameter position. In a case where the two-dimensional code 40 is engraved in a region where the distance H is more than 70% of the cross-sectional height SH, significant strain results from load on the tire 10, the dot holes 40a are likely to be cracked, and these cracks are also likely to develop. The distance H is preferably 40% or less of the cross-sectional p height SH.

The two-dimensional code 40 illustrated in FIG. 1 is preferably provided on each of the sidewall portions 10S on both sides of the tire 10 in the tire lateral direction. Even after the tire 10 is mounted on a vehicle, the two-dimensional code 40 engraved in the sidewall portion 10S on one side can be reliably read.

Example, Comparative Example

To confirm the effects of the embodiments described above, various tires 10 (tire size: 195/65R15 91H) were manufactured with the two-dimensional code 40 (specifically, a QR code (registered trademark)) disposed at different positions in the tire radial direction. The readability of the two-dimensional codes 40 was tested during long-term use of the tire 10. The tire configuration of each tire 10 is as illustrated in FIG. 1.

Each dot hole 40a of the two-dimensional code 40 had an inner diameter of 0.5 mm and a depth of 0.7 mm. The QR code® (registered trademark) had a size of 15 mm×15 mm.

To simulate long-term use of the tire 10, drum testing was conducted on each tire 10 on an indoor drum under predetermined conditions simulating long-term use. The drum testing is low-pressure testing based on FMVSS139 (Federal Motor Vehicle Safety Standards Standard No. 139) (rim size: 15×6 J, XL: 160 kPa, and load: 100% LI). For the predetermined conditions simulating long-term use, specifically, the vehicle was driven 10000 km at a speed of 81 km/h, with the tire 10 irradiated with ozone at an ozone concentration of 100 pphm. After driving, whether the two-dimensional code 40 could be read was checked using a mobile terminal with varied methods of applying illumination light.

Five tires 10 subjected to driving were prepared for each Example and Comparative Example, and the two-dimensional code 40 was read with varied methods of applying illumination light. A reading rate was defined as the ratio of the number of correct readings to the number of readings of the two-dimensional code 40. The reading rate in the Examples is expressed as an index value, with the reading rate in the Comparative Example assigned as a reference (the reading rate in the Comparative Example assigned an index of 100). Larger index values indicate a higher reading rate.

Table 1 below indicates results of the reading rate (readability) of the two-dimensional code 40 with respect to the arrangement position of the two-dimensional code 40.

In Table 1 below, "within two-dimensional code range" in the section "position of bead filler rubber edge Be with respect to two-dimensional code" indicates that the position of the bead filler rubber edge Be in the tire radial direction lies within the two-dimensional code range, "outward in tire radial direction" means that the position of the bead filler rubber edge Be in the tire radial direction lies outward of the two-dimensional code range in the tire radial direction, and "inward in tire radial direction" means that the position of the bead filler rubber edge Be in the tire radial direction lies inward of the two-dimensional code range in the tire radial direction.

TABLE 1-1

|  | Comparative Example | Example 1 | Example 2 |
|---|---|---|---|
| Position of bead filler rubber edge Be with respect to two-dimensional code | Within two-dimensional code range | Outward in tire radial direction | Inward in tire radial direction |
| Distance L1/length L0 | — | 3% | 3% |
| Reading rate | 100 | 102 | 102 |

TABLE 1-2

|  | Example 3 | Example 4 | Example 5 | Example 6 |
| --- | --- | --- | --- | --- |
| Position of bead filler rubber edge Be with respect to two-dimensional code | Inward in tire radial direction | Inward in tire radial direction | Inward in tire radial direction | Inward in tire radial direction |
| Distance L1/length L0 | 5% | 10% | 100% | 105% |
| Reading rate | 104 | 105 | 105 | 103 |

The Table indicates that, compared to the Comparative Example, all of Examples 1 to 6 exhibit a higher reading rate.

In particular, the Table indicates that the reading rate is improved by setting the distance L1/L0 to 5% or more. In addition, the Table indicates that, in a case where the two-dimensional code range lies outward of the bead filler rubber edge Be in the tire radial direction, the distance L1/L0 is preferably set to from 5% to 100% in view of an improved reading rate.

The foregoing has been a detailed description of the pneumatic tire according to embodiments of the present technology. However, the present technology is naturally not limited to the above embodiments and Examples, and may be improved or modified in various ways within the scope of the present technology.

The invention claimed is:

1. A pneumatic tire comprising:
a pair of bead cores with an annular shape;
at least one carcass ply with a toroidal shape wound about the pair of bead cores and provided between the pair of bead cores;
side rubber provided in each of sidewall portions of the pneumatic tire to cover the carcass ply from outside the tire; and
bead filler rubber provided along the carcass ply and extending outward in a tire radial direction from a side of each of the pair of bead cores,
a two-dimensional code being provided on a surface of the side rubber, the two-dimensional code formed of a dot pattern including two types of gray scale elements identifiably formed using surface irregularities on the side rubber, and
a two-dimensional code range in the tire radial direction in which the two-dimensional code is provided lying outward or inward in the tire radial direction of a bead filler rubber edge located outward of the bead filler rubber in the tire radial direction, wherein
a distance along the tire radial direction between the bead filler rubber edge and an outer edge of the two-dimensional code located closest to the bead filler rubber edge is 5% or more and 100% or less of a length of the two-dimensional code along the tire radial direction.

2. The pneumatic tire according to claim 1, wherein the two-dimensional code range lies outward of the bead filler rubber edge in the tire radial direction and lies inward, in the tire radial direction, of a maximum width position of the carcass ply located farthest outward from a tire equator line in a tire lateral direction.

3. The pneumatic tire according to claim 1, wherein the bead filler rubber has a higher hardness than the side rubber.

4. The pneumatic tire according to claim 1, wherein the two-dimensional code is provided in a smooth surface region of the surface of the sidewall portion where surface irregularities of ridges are not provided.

5. The pneumatic tire according to claim 1, wherein
the surface irregularities in the dot pattern include dot holes formed in the side rubber, and
a portion of the side rubber in the two-dimensional code range has a thickness of 2.5 mm or more at any location.

6. The pneumatic tire according to claim 1, wherein
the surface irregularities in the dot pattern include dot holes formed in the side rubber, and
a distance from a bottom of each of the dot holes to the carcass ply is 2.5 or more times as long as a hole depth of each of the dot holes.

7. The pneumatic tire according to claim 1, wherein,
assuming that SH is a cross-sectional height along the tire radial direction from an innermost position of each of the pair of bead cores in the tire radial direction to a tire maximum outer diameter position, a distance H along the tire radial direction from the innermost position of each of the pair of bead cores in the tire radial direction to a center position of the two-dimensional code in the tire radial direction is 70% or less of the cross-sectional height SH.

8. The pneumatic tire according to claim 1, wherein the two-dimensional code is provided on each of the sidewall portions on both sides of the pneumatic tire in a tire lateral direction.

9. The pneumatic tire according to claim 1, wherein a blank region is provided on the surface of the side rubber around a region of the dot pattern, the blank region including light-colored elements of the gray scale elements.

10. The pneumatic tire according to claim 1, wherein
the carcass ply is wound about the pair of bead cores and extends outward in the tire radial direction, and
the two-dimensional code is positioned in the tire radial direction between the bead filler rubber edge and an end of a portion of the carcass ply which extends outward in the tire radial direction.

11. The pneumatic tire according to claim 1, wherein a boundary between the side rubber and an other rubber contacting the side rubber in the tire radial direction does not exist in the two-dimensional code range.

12. The pneumatic tire according to claim 1, wherein
the surface irregularities in the dot pattern include dot holes formed in the side rubber, and
a hole depth of the dot holes is from 0.65 mm to 1.0 mm.

13. The pneumatic tire according to claim 1, wherein a portion of the side rubber between the two-dimensional code and the bead filler rubber edge has a greater thickness than thicknesses of the side rubber at the two-dimensional code range and the bead-filler rubber edge.

14. The pneumatic tire according to claim 13, wherein
a blank region is provided on the surface of the side rubber around a region of the dot pattern, the blank region including light-colored elements of the gray scale element, and
the blank region is positioned at the portion of the side rubber between the two-dimensional code and the bead-filler rubber edge.

15. The pneumatic tire according to claim 1, wherein a portion of the side rubber on which the two-dimensional code is provided has a thickness which becomes greater as approaching the bead-filler rubber edge.

16. The pneumatic tire according to claim 15, wherein the portion of the side rubber on which the two-dimensional code is provided is flat.

17. The pneumatic tire according to claim 1, wherein a distance along the tire radial direction between the bead filler rubber edge and an outer edge of the two-dimensional code located closest to the bead filler rubber edge is 1.5 or more times as long as a length of one side of a unit cell forming the dot pattern of the two-dimensional code.

18. The pneumatic tire according to claim 17, wherein the two-dimensional code range lies outward of the bead filler rubber edge in the tire radial direction and lies inward, in the tire radial direction, of a maximum width position of the carcass ply located farthest outward from a tire equator line in a tire lateral direction.

19. The pneumatic tire according to claim 18, wherein the bead filler rubber has a higher hardness than the side rubber.

20. A pneumatic tire comprising:
a pair of bead cores with an annular shape;
at least one carcass ply with a toroidal shape wound about the pair of bead cores and provided between the pair of bead cores;
side rubber provided in each of sidewall portions of the pneumatic tire to cover the carcass ply from outside the tire; and
bead filler rubber provided along the carcass ply and extending outward in a tire radial direction from a side of each of the pair of bead cores,
a two-dimensional code being provided on a surface of the side rubber, the two-dimensional code formed of a dot pattern including two types of gray scale elements identifiably formed using surface irregularities on the side rubber, and
a two-dimensional code range in the tire radial direction in which the two-dimensional code is provided lying inward in the tire radial direction of a bead filler rubber edge located outward of the bead filler rubber in the tire radial direction, and
a distance along the tire radial direction between the bead filler rubber edge and an outer edge of the two-dimensional code located closest to the bead filler rubber edge is 5% or more and 100% or less of a length of the two-dimensional code along the tire radial direction.

* * * * *